United States Patent
Lim et al.

(10) Patent No.: US 9,244,824 B2
(45) Date of Patent: Jan. 26, 2016

(54) MEMORY SUB-SYSTEM AND COMPUTING SYSTEM INCLUDING THE SAME

(71) Applicant: SAMSUNG ELECTRONICS CO., LTD., Suwon-si, Gyeonggi-do (KR)

(72) Inventors: Sun-Young Lim, Seoul (KR); Dong-Hwi Kim, Yongin-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 247 days.

(21) Appl. No.: 13/932,352

(22) Filed: Jul. 1, 2013

(65) Prior Publication Data

US 2014/0013066 A1     Jan. 9, 2014

Related U.S. Application Data

(60) Provisional application No. 61/668,253, filed on Jul. 5, 2012.

(30) Foreign Application Priority Data

Mar. 11, 2013    (KR) ........................ 10-2013-0025476

(51) Int. Cl.
| | |
|---|---|
| *G06F 12/00* | (2006.01) |
| *G06F 12/02* | (2006.01) |
| *G06F 3/06* | (2006.01) |
| *G06F 13/38* | (2006.01) |
| *G06F 13/16* | (2006.01) |

(52) U.S. Cl.
CPC .............. *G06F 12/00* (2013.01); *G06F 3/0602* (2013.01); *G06F 3/0604* (2013.01); *G06F 12/0238* (2013.01); *G06F 13/1684* (2013.01); *G06F 13/382* (2013.01); *Y02B 60/1228* (2013.01)

(58) Field of Classification Search
CPC ..... G06F 3/0602; G06F 3/0604; G06F 3/061; G06F 3/0625; G06F 3/0626; G06F 3/0646; G06F 3/0685; G06F 13/382; G06F 13/385; G06F 12/0238; G06F 12/0246
See application file for complete search history.

(56) References Cited

U.S. PATENT DOCUMENTS

| | | | |
|---|---|---|---|
| 6,148,377 | A * | 11/2000 | Carter et al. .................. 711/147 |
| 2009/0100307 | A1 | 4/2009 | Lee |
| 2009/0235015 | A1 | 9/2009 | Hatsuda et al. |
| 2009/0313416 | A1 | 12/2009 | Nation |
| 2010/0037005 | A1 | 2/2010 | Kim et al. |
| 2011/0010508 | A1 | 1/2011 | Miyazaki et al. |
| 2011/0131366 | A1 * | 6/2011 | Nakai ................. G06F 12/0246 711/103 |

FOREIGN PATENT DOCUMENTS

| | | |
|---|---|---|
| JP | 2003-256269 | 9/2003 |
| JP | 2004-310220 | 11/2004 |
| JP | 2006-146817 | 6/2006 |
| JP | 2012-022475 | 2/2012 |
| KR | 1020090066071 | 6/2009 |

* cited by examiner

*Primary Examiner* — Shawn X Gu
(74) *Attorney, Agent, or Firm* — F. Chau & Associates, LLC

(57) ABSTRACT

A memory sub-system includes a main memory, a storage device, a control unit, and a common interface unit. The control unit is configured to control the main memory and the storage device. The common interface unit is operatively coupled to the control unit, and is configured to access the main memory and the storage device through the control unit in response to a request received from a host.

14 Claims, 13 Drawing Sheets

MEMORY SUB-SYSTEM AND COMPUTING SYSTEM INCLUDING THE SAME

CROSS-REFERENCE TO RELATED APPLICATIONS

This application claims priority under 35 USC §119 to U.S. Provisional Application No. 61/668,253, filed on Jul. 5, 2012, and Korean Patent Application No. 10-2013-0025476, filed on Mar. 11, 2013, the entire contents of which are incorporated by reference herein in their entirety.

TECHNICAL FIELD

The present disclosure relates to semiconductor devices, and more particularly, to semiconductor memory devices.

DISCUSSION OF THE RELATED ART

Current data processing systems may include dynamic random access memory (DRAM) operating as the main memory in the systems, and non-volatile flash memory devices used by the systems to retain data in low power conditions. Since the DRAM and the flash memory devices are not compatible with each other, data processing systems include respective control and data interfaces for the DRAM and the flash memory devices. Storage operations implemented with the DRAM may have an effect on power consumption of the systems, and memory operations implemented with the flash memory devices may have an effect on operating speed and latency of the systems.

SUMMARY

Exemplary embodiments of the present invention provide memory sub-systems capable of reducing power consumption and improving performance.

According to an exemplary embodiment of the present invention, a memory sub-system includes a main memory, a storage device, a control unit, and one common interface unit. The control unit controls the main memory and the storage device. The one common interface unit is connected to the control unit and accesses the main memory and the storage device through the control unit according to a request from an external host.

In an exemplary embodiment, the control unit may control the main memory and the storage device based on a command included in a request packet received from the host.

The control unit may regard a first data packet following the request packet as an extended request packet, and may control the main memory and the storage device based on an extended command included in an extended header of the extended request packet when the command corresponds to an extended memory operation.

When the extended command corresponds to a memory copy operation to copy data stored in the main memory or in the storage device, a payload of the extended packet may include source addresses indicating a source area in which the data is stored, and a payload of the request packet may include destination addresses indicating a target area in which the data is to be stored.

In an exemplary embodiment, the source addresses may be addresses designating a first area of the main memory, and the destination addresses may be addresses designating a second area of the storage device.

In an exemplary embodiment, the source addresses may be addresses designating a first area of the storage device, and the destination addresses may be addresses designating a second area of the main memory.

In an exemplary embodiment, the source addresses may be addresses designating a first area of the main memory, and the destination addresses may be addresses designating a second area of the main memory. The second area may be different from the first area.

In an exemplary embodiment, the control unit may control the storage device by mapping at least one page of the storage device to some area of the main memory.

The control unit may synchronize a first map of the storage device with a second map of the main memory, or may desynchronize the first map of the storage device with the second map of the main memory using a synchronization command and a desynchronization command included in the extended command.

The control unit may map at least one page address of the storage device to a physical address of the main memory, and the host may directly manage the physical address of the main memory, the physical address of the main memory being allocated to the host.

The control unit may further include a buffer, the control unit may map at least one page address of the storage device to a buffer address of the buffer, and the host may manage a virtual address of the main memory mapped to the buffer address.

In an exemplary embodiment, the control unit may control the main memory and the storage device by performing a swap operation in which at least one of pages loaded in the main memory is stored in the storage device when a new page is to be allocated in the main memory and the main memory does not include an unused physical page.

In an exemplary embodiment, the control unit may further include a special function register in which information for the initial setting of the storage is set.

In an exemplary embodiment, the main memory may include one of a dynamic random access memory, a static random access memory, a phase-change random access memory and a ferroelectric random access memory, and the storage device may include a flash memory.

According to an exemplary embodiment of the present invention, a computing system includes a host and a memory sub-system. The host includes a processor. The memory sub-system is connected to the host and the memory sub-system executes a request received from the host. The memory sub-system includes a main memory, a storage device, a control unit and one common interface unit. The control unit controls the main memory and the storage device. The one common interface unit is connected to the control unit and accesses the main memory and the storage device through the control unit according to the request from the host.

According to an exemplary embodiment of the present invention, an interface unit for a computing system includes a decoder and an encoder. The decoder includes a header parser configured to extract a header from a packet received from a host, analyze the extracted header, and provide a command to a control unit of a memory sub-system in the computing system, and a payload detector configured to detect a payload in the packet received from the host, and provide the detected payload to the control unit. The encoder includes a header generator configured to generate a header of a packet to be transmitted to the host based on an output received from the control unit, and a payload generator configured to generate a payload of the packet to be transmitted to the host based on the output received from the control unit. The interface unit is disposed in the memory sub-system, and is configured to access a main memory and a storage device in the memory sub-system through the control unit. The control unit is configured to control the main memory and the storage device based on the command.

Accordingly, power consumption of the computing system may be reduced and performance of the computing system may be improved by accessing the main memory and the storage device through the one common interface unit, reducing the occupation of a channel between the host and the memory sub-system and the internal bus of the host.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
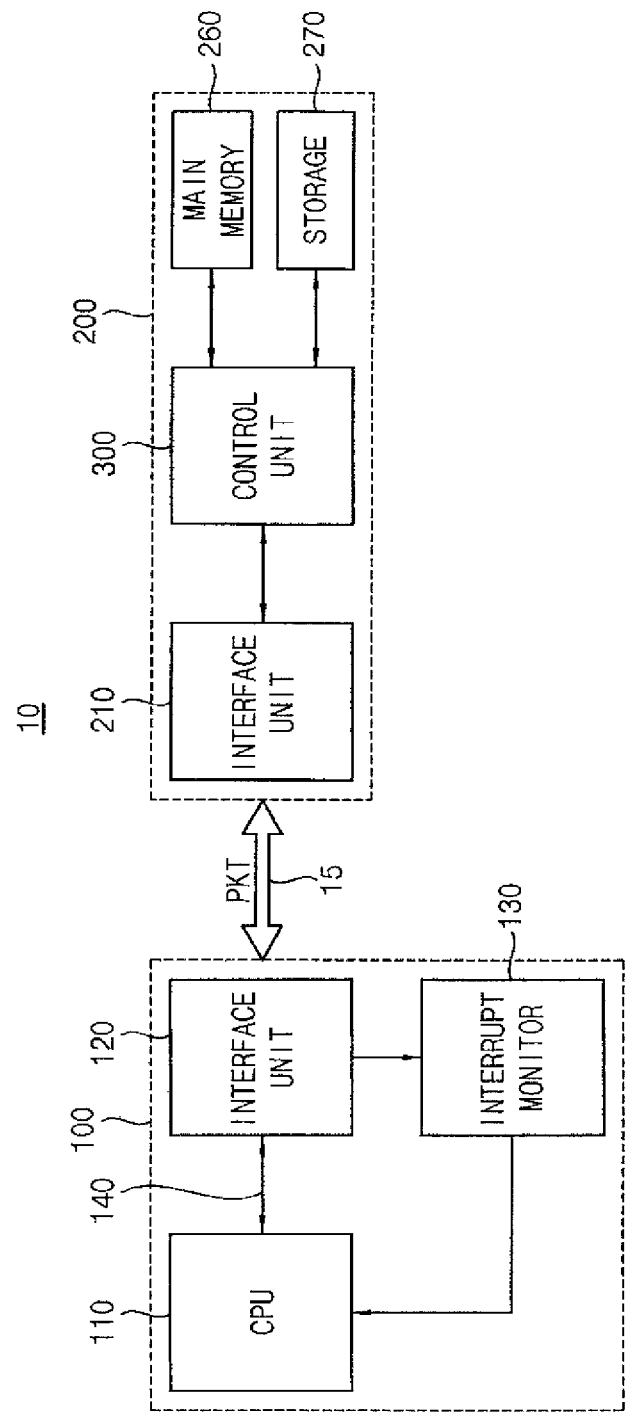
FIG. 1 is a block diagram illustrating a computing system, according to an exemplary embodiment of the present invention.

Exemplary embodiments of the present invention will be described more fully hereinafter with reference to the accompanying drawings. Like reference numerals may refer to like elements throughout the accompanying drawings.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present.

FIG. 1 is block diagram illustrating a computing system, according to an exemplary embodiment of the present invention.

Referring to FIG. 1, a computing system 10 includes a host 100 and a memory sub-system 200. The host 100 is external to the memory sub-system, and may be referred to as an external host 100.

The host 100 includes a processor 110, an interface unit 120 and an interrupt monitor 130. The processor 110 performs various computing functions, such as, for example, executing specific software for performing specific calculations or tasks. For example, the processor 110 may be a microprocessor, a central processing unit (CPU), a digital signal processor, etc., that includes integrated circuitry and other electronic elements for performing processing.

In an exemplary embodiment, the processor 110 is coupled to the interface unit 120 via a bus 140, such as, for example, an address bus, a control bus and/or a data bus. The interface unit 120 transfers commands, addresses and/or data from the processor 110 to the memory sub-system 200, and transfers data or an interrupt signal from the memory sub-system 200 to the processor 110 or the interrupt monitor 130. The interrupt monitor 130 may set an interrupt register in the processor 110 based on the interrupt signal received from the interface unit 120.

In an exemplary embodiment, the main memory 260 may be implemented with dynamic random access memory (DRAM). However, the main memory 260 is not limited thereto. For example, the main memory 260 may also be implemented with a static random access memory (SRAM), a phase-change random access memory (PRAM), a ferroelectric random access memory (FRAM), a resistive random access memory (RRAM), a magnetic random access memory (MRAM), etc. The storage device 270 may be implemented with a memory device such as, for example, NAND flash memory or NOR flash memory. However, the storage device 270 is not limited thereto. The control unit 300 controls the main memory 260 and the storage device 270 according to a request from the host 100. The interface unit 210 is operatively coupled to the control unit 300, and the interface unit 210 accesses the main memory 260 and the storage device 270 in response to a request from the host 100. Thus, the one interface unit 210 is common to both the main memory 260 and the storage device 270, and may be referred to herein as a common interface unit 210.

The host 100 and the memory sub-system 200 execute transactions based on a packet PKT. For example, the host 100 may transmit a request packet such that the memory sub-system 200 performs a specific operation, and the memory sub-system 200 may parse the command in the received request packet, perform an operation(s) corresponding to the command, and provide an operation result to the host 100. In addition, the memory sub-system 200 may access the main memory 260 and the storage device 270 through the one common interface unit 210. Therefore, when the data is exchanged between the main memory 260 and the storage device 270, a channel 15 between the host 100 and the memory sub-system 200 and the bus 140 in the host 100 are not occupied. As a result, power consumption of the computing system 10 may be reduced, and performance of the computing system 10 may be improved.

Figure 2:
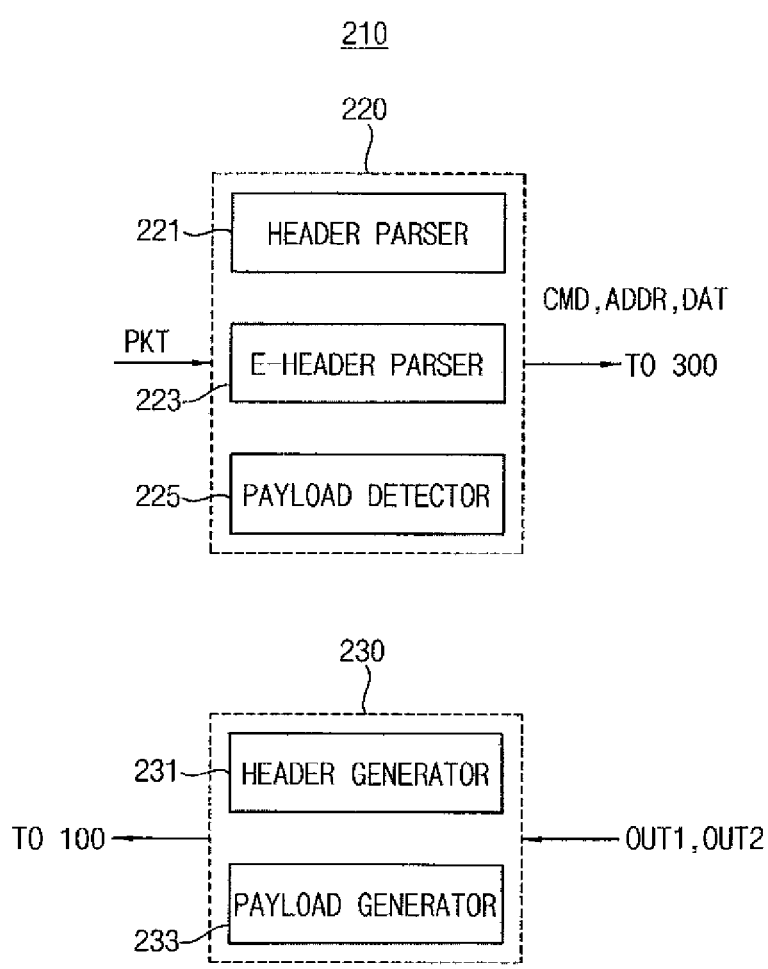
FIG. 2 is a block diagram illustrating an example of the interface unit of the memory sub-system in FIG. 1, according to an exemplary embodiment of the present invention.

FIG. 2 a block diagram illustrating an example of the interface unit of the memory sub-system in FIG. 1, according to an exemplary embodiment of the present invention.

Referring to FIG. 2, the interface unit 210 of the memory sub-system 200 may include a decoder 220 and an encoder 230.

The decoder 220 may include a header parser 221, an extended header parser 223 and a payload detector 225. The header parser 221 extracts a header from the packet PKT received from the host 100, analyzes the extracted header, and provides the control unit 300 with control messages and the command CMD. The extended header parser 223 extracts an extended header from an extended request packet received from the host 100, analyzes the extracted extended header, and provides the control unit 300 with control messages and the extended command when the packet PKT corresponds to the extended request packet. The payload detector 225 detects a payload in the packet PKT and provides the detected payload to the control unit 300. The payload may include, for example, an address ADDR and/or data DAT.

The encoder 230 may include a header generator 231 and a payload generator 233. The header generator 231 generates a header of a packet to be transmitted to the host 100 based on a first output OUT1 or a second output OUT2 received from the control unit 300. The payload generator 233 generates a payload of the packet to be transmitted to the host 100 based on the first output OUT1 or the second output OUT2 received from the control unit 300.

Figure 3:
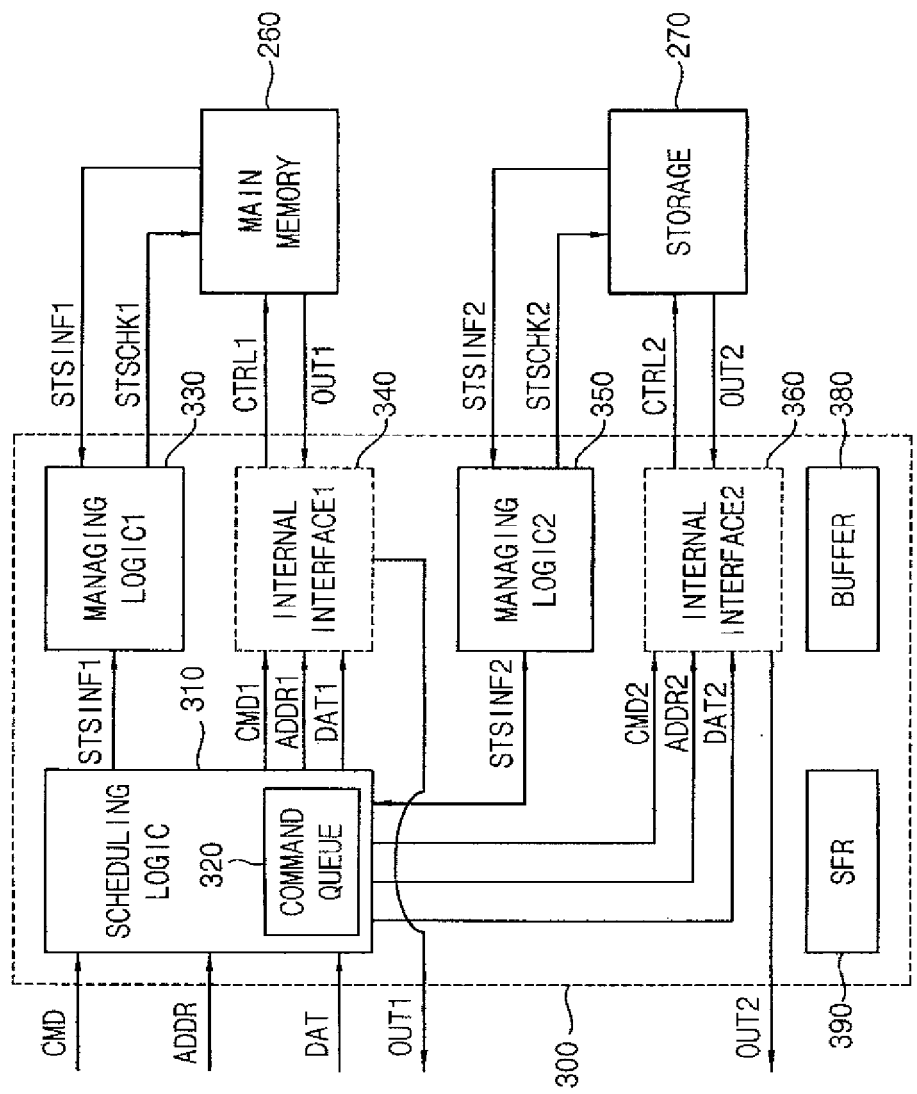
FIG. 3 is a block diagram illustrating an example of the control unit in FIG. 1, according to an exemplary embodiment of the present invention.

FIG. 3 a block diagram illustrating an example of the control unit in FIG. 1, according to an exemplary embodiment of the present invention.

Referring to FIG. 3, the control unit 300 may include a scheduling logic unit 310 including a command queue 320, a first managing logic unit 330, a second managing logic unit 350, a special function register (SFR), 390 and a buffer 380. The control unit 300 may further include a first internal interface 340 and a second internal interface 360.

The scheduling logic unit 310 may receive the command CMD, the address ADDR and/or the data DAT from the interface unit 210, and determine whether the command CMD, the address ADDR and/or the data DAT are associated with the main memory 260 or the storage device 270. When the command CMD, the address ADDR and/or the data DAT are used to access the main memory 260, the scheduling logic unit 310 provides the first internal interface 340 with the command CMD, the address ADDR and the data DAT as a first command CMD1, a first address ADDR1 and first data DAT1. The first internal interface 340 provides the main memory 260 with a first control signal CTRL1 for accessing the main memory 260 based on the first command CMD1, the first address ADDR1 and the first data DAT1. The main memory 260 performs an operation according to the first control signal CTRL1 to provide the first output OUT1 to the first internal interface 340. The first internal interface 340 provides the first output OUT1 to the interface unit 210.

When the command CMD, the address ADDR and/or the data DAT are used to access the storage device 270, the scheduling logic unit 310 provides the second internal interface 360 with the command CMD, the address ADDR and the data DAT as a second command CMD2, a second address ADDR1 and second data DAT2. The second internal interface 360 provides the storage device 270 with a second control signal CTRL2 for accessing the storage device 270 based on the second command CMD2, the second address ADDR2 and the second data DAT2. The storage device 270 performs an operation according to the second control signal CTRL2 to provide the second output OUT2 to the second internal interface 360. The second internal interface 360 provides the second output OUT2 to the interface unit 210.

The first managing logic unit 330 may provide the main memory 260 with a first status checking signal STSCHK1 for checking a status of the main memory 260, and receive a first status information signal STSINF1 indicating the status of the main memory 260. The first managing logic unit 330 may provide the first status information signal STSINF1 to the scheduling logic unit 310. The second managing logic unit 350 may provide the storage device 270 with a second status checking signal STSCHK2 for checking a status of the storage device 270, and receive a second status information signal STSINF2 indicating the status of the storage device 270. The second managing logic unit 350 may provide the second status information signal STSINF2 to the scheduling logic unit 310.

The scheduling logic unit 310 includes the command queue 320, and the command queue 320 stores a plurality of commands. The command queue 320 may schedule the plurality of commands based on priorities of the commands, the first status information signal STSINF1, and the second status information signal STSINF2.

In addition, the interface unit 210 may include a host controller interface (HCI) of a universal flash interface (UFI), and the interface unit 210 may set the SFR 390 using the HCI to set a specification of the storage device 270. That is, the SFR 390 may store information for initially setting the storage device 270.

The buffer 380 may be used when at least one page of the storage device 270 is mapped to a virtual address from a view of the host 100.

Figure 4:
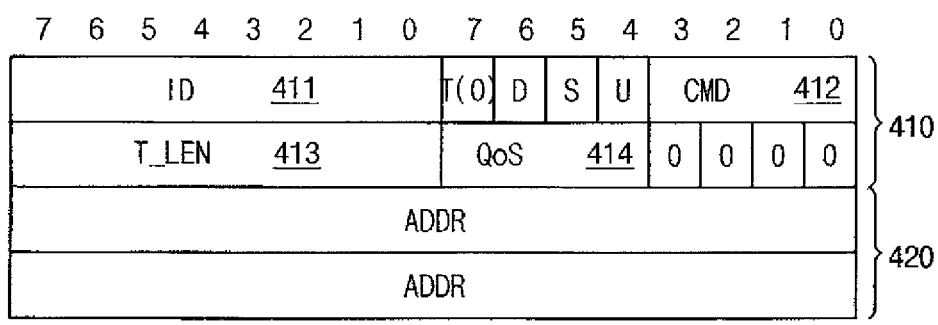
FIG. 4 illustrates an example of a request packet used in the computing system of FIG. 1, according to an exemplary embodiment of the present invention.

FIG. 4 illustrates an example of a request packet used in the computing system of FIG. 1, according to an exemplary embodiment of the present invention.

Referring to FIG. 4, a request packet 400a may include a header 410 and a payload 420. The request packet 400a may include 64 bits. For example, the header 410 may include an 8-bit identity field 411, a 4-bit control message field T, D, S and U, a 4-bit command field 412, a total length field 413 of a 16-byte transaction, and a 4-bit Quality of Service (QoS) field 414. The payload 420 may include destination addresses, which are 16-byte multiples. The QoS filed 414 indicates a priority of the request packet 400a. The scheduling logic unit 310 may flexibly alter the processing order of the request packet 410a based on the priority of the request packet 400a, the first status information signal STSINF1, and the second status information signal STSINF2.

Figure 5:
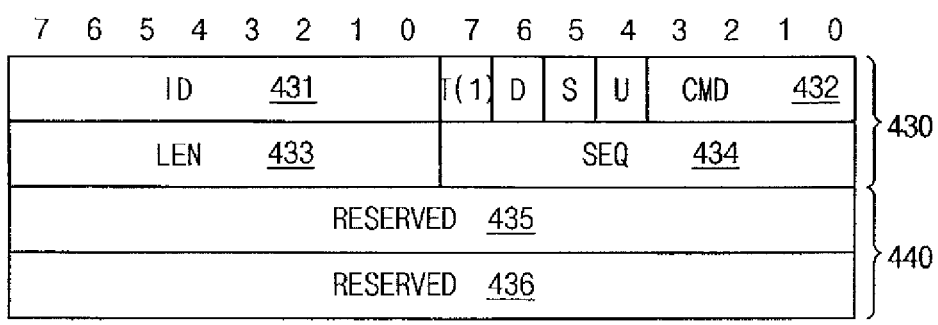
FIG. 5 illustrates an example of a request packet used in the computing system of FIG. 1, according to an exemplary embodiment of the present invention.

FIG. 5 illustrates another example of a request packet used in the computing system of FIG. 1, according to an exemplary embodiment of the present invention.

Referring to FIG. 5, a request packet 400b may include a header 430 and a payload 440. The request packet 400b may include 64 bits. The header 430 may include an 8-bit identity field 431, a 4-bit control message field T, D, S and U, a 4-bit command field 432, a total length field 433 of a 16-byte data packet, and an 8-bit packet sequence number field 434. The payload 440 may include reserved fields 435 and 436.

Table 1 shows a description of each field of the request packet 400a of FIG. 4 and the request packet 400b of FIG. 5.

TABLE 1

| Field | Bit count | Description |
| --- | --- | --- |
| ID | 8 | Request ID, is not 0 |
| T | 1 | Request packet type flag |
| D | 1 | Data: 0, Instruction: 1 |
| S | 1 | Secure access: 1, Insecure access: 0 |
| U | 1 | User access: 0, Kernel access: 1 |
| CMD | 4 | Command |
| T_LEN | 8 | Total number of 16-byte transaction length |
| LEN | 8 | Number of 16-byte data packet length |
| SEQ | 8 | Packet sequence number |
| QoS | 4 | Quality of Service |
| ADDR | 32 | Destination address (multiple of 16-byte) |

Referring to FIG. 4, the value of T in the request packet 400a may be 0, and the request packet 400a may thus correspond to a type 0 request packet. The type 0 request packet is a packet requesting a new type of transaction, and the packet sequence number SEQ of the type 0 request packet is automatically 00000000b.

Referring to FIG. 5, the value of T in the request packet 400b may be 1, and the request packet 400b may thus correspond to a type 1 request packet. The type 1 request packet is a packet adding a new sequence to a previous transaction, and the identity ID of the type 1 request packet is the same as an identity of the previous transaction.

The request packets 400a and 400b are transferred to the memory sub-system 200 from the host 100, and the memory sub-system 200 transmits a response packet in response to the request packet.

Figure 6:
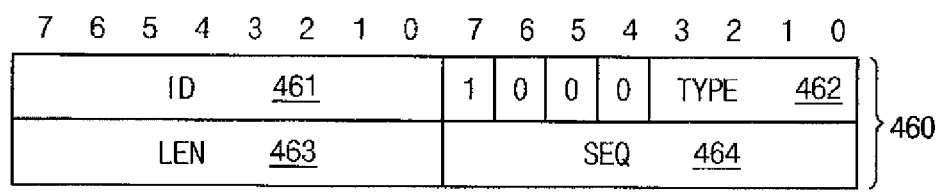
FIG. 6 illustrates an example of a response packet used in the computing system of FIG. 1, according to an exemplary embodiment of the present invention.

FIG. 6 illustrates an example of a response packet used in the computing system of FIG. 1, according to an exemplary embodiment of the present invention.

Referring to FIG. 6, a response packet 450 may include a 32-bit header 460. The header 460 may include an 8-bit identity field 461, a 4-bit type field 462, an 8-bit number field 463 of a 16-byte data packet, and a packet sequence number SEQ field 464. The number field 463 of the 16-byte data packet represents a total number of data packets following the response packet 450 sent from the memory sub-system 200 to the host 100.

Table 2 shows a description of each field of the response packet 450 of FIG. 6.

TABLE 2

| Name | Bit count | Description |
| --- | --- | --- |
| ID | 8 | Response ID (equal to Request ID). If ID is 0, then response packet is message packet |
| Type | 4 | Response type |
| LEN | 8 | Number of 16-byte data packet length. Real data length (1 = 16 byte) |
| SEQ | 8 | Sequence number |

Referring to Table 2, when the identity field ID of the response packet 450 has a value of 0, the response packet 450 may correspond to a message field.

Figure 7:
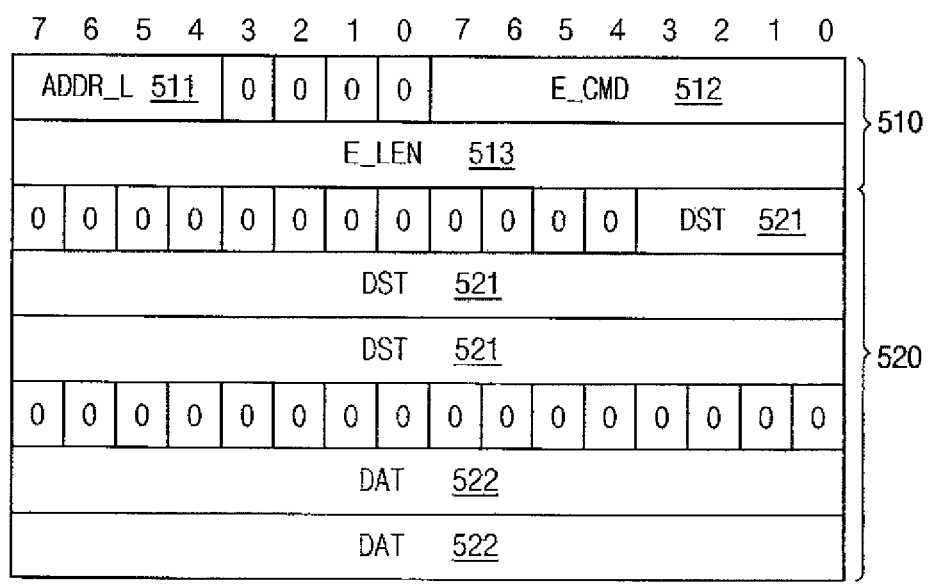
FIG. 7 illustrates an example of an extended request packet used in the computing system of FIG. 1, according to an exemplary embodiment of the present invention.

FIG. 7 illustrates an example of an extended request packet used in the computing system of FIG. 1, according to an exemplary embodiment of the present invention.

Figure 8:
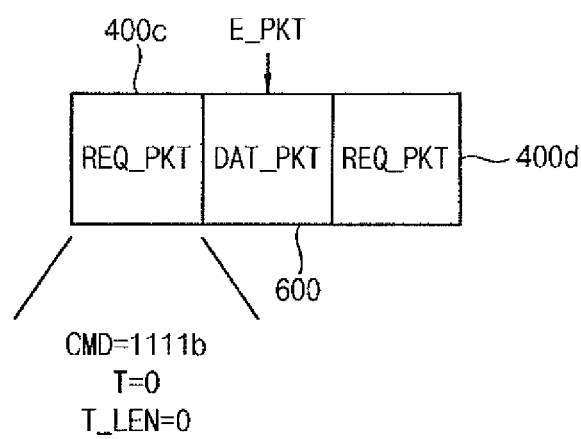
FIG. 8 illustrates a data packet being used as an extended request packet in the computing system of FIG. 1, according to an exemplary embodiment of the present invention.

FIG. 8 illustrates a data packet being used as an extended request packet in the computing system of FIG. 1, according to an exemplary embodiment of the present invention.

A data packet may be used as an extended request packet in the computing system 10 of FIG. 1, as illustrated in FIG. 8. Utilization of a data packet as an extended request packet may improve the performance of the computing system 10. When the command field CMD has a value of 1111b, T has a value of 0, and the total number of data packet T_LEN has a value of 0 in the request packet, the command field CMD indicates that an extended memory operation is being performed. When the command corresponds to an extended memory operation, a first data packet 600 of the data packets following the request packet 400c may be used as a 16-byte extended request packet E_PKT. That is, the control unit 300 may regard the first data packet 600 of the data packets following the request packet 400c as an extended request packet when an extended memory operation is enabled. A request packet 400d may follow the extended request packet 600.

Referring to FIG. 7, an extended request packet 500 may include a 4-byte extended header 510 and a 12-byte extended payload 520. The extended header 510 may include a 4-bit offset address field ADDR_L 511, an 8-bit extended command field 512, a 16-bit data-byte length field E_LEN 513 for a memory operation, a 36-bit source address field DST 521, and a 32-bit data pattern field DAT 532 for data setting.

The memory sub-system 200 may perform extended memory operations in response to the extended request packet 500 as illustrated in FIG. 7.

Table 3 shows a description of each field of the extended request packet 500 of FIG. 7.

TABLE 3

| Field | Bit count | Description |
| --- | --- | --- |
| ADDR_L | 4 | 16 byte offset of address If Response EH, ADDR_L = 0000b |
| E_CMD | 8 | Extended GMI Command |
| E_LEN | 16 | Data byte length of operation Ex) RD/WR/Memcpy, Memset |
| DST | 36 | Destination Address of E_CMD, Memcpy, Memset |
| DAT | 32 | Data pattern of Memset |

Figure 9:
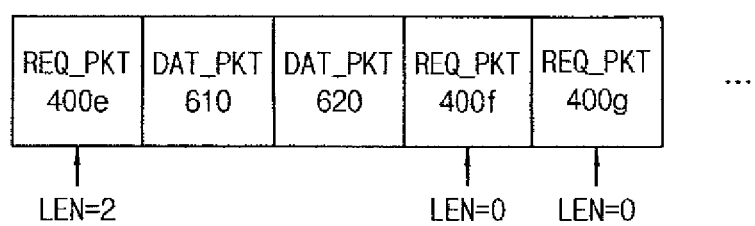
FIG. 9 illustrates the relationship between the request packet and the data packet, according to an exemplary embodiment of the present invention.

FIG. 9 illustrates the relationship between the request packet and the data packet, according to an exemplary embodiment of the present invention.

Referring to FIG. 9, data packets are transmitted following a request packet 400e or a response packet based on a value of total number field LEN of the respective request packets. When the request packets 400f and 400g are 0, data packet are not transmitted following the request packets 400f and 400g.

The data packets may be used as a data mask packet or the extend request packet as described with reference to FIG. 7, according to the value of the command field CMD of the header.

Table 4 shows a description of each command according to the command fields 412 and 432 in the request packets 400a in FIG. 4 and 400b in FIG. 5, respectively.

TABLE 4

| Command | 4 bits | Type 0 | Type 1 | Description |
|---|---|---|---|---|
| RD | 0010b | O | O | 16-byte incrementing burst read |
| WR | 0001b | O | O | 16-byte incrementing burst write |
| WR_DM | 0011b | O | O | Write 32-byte data with data mask |
| CTRLRDY | 1000b | O | O | Host is ready to get packet |
| CTRLERR | 1001b | O | O | Host error status |
| RSP_ERR | 1011b |  | O | Response packet error (CRC, etc . . . ) |
| WAIT | 1110b |  | O | Wait host data transfer LEN has transferred data length |
| E_HD_EN | 1111b | O | O | Enable extended 16-byte packet |

Table 5 shows a description of each command according to the type field 462 in the response packet in FIG. 6, according to an exemplary embodiment of the present disclosure.

TABLE 5

| Type | 4 bits | Description |
|---|---|---|
| CTRLRDY | 1000b | Slave is ready to get packet |
| CTRLERR | 1001b | Slave error |
| REQ_OK | 1010b | Request completion |
| REQ_ERR | 1011b | Request error |
| WAIT | 1110b | Wait host data transfer LEN has transferred data length |
| E_HD_EN | 1111b | Enable extended 16-byte packet |

Table 6 shows a description of each command according to the extended command field 512 in the extended request packet in FIG. 7, according to an exemplary embodiment of the present invention.

TABLE 6

| Extended Command | 8 bits | Request | Response | Description |
|---|---|---|---|---|
| WR_MSG | 00011000b |  | O | Write 4-byte data at DST address E_LEN equals 1, used for host internal register setting. Ex) Interrupt controller |
| PTN_RD | 00011010b |  | O | Read response 4-byte data pattern, number of E_LEN size (E_LEN is multiple of 4) |
| PTN_WR | 00011011b | O |  | Repeat write 4-byte data pattern, number of E_LEN size (E_LEN is multiple of 4) Byte address support (ADDR_L is available) Ex)same as memset operation |
| Memcpy | 00011001b | O |  | Memory copy ADDR address to DST address Byte address support (ADDR_L is available) |
| MapIMS | 00100000b | O |  | Connect memory address link from flash page address |
| UnmapIMS | 00100001b | O |  | Disconnect memory address link from flash address |
| FlushIMS | 00100010b | O |  | Flush updated data in DRAM to flash page |
| MRR | 00110000b | O |  | Mode Register Read |
| MRW | 00110001b | O |  | Mode Register Write |

Figure 10:
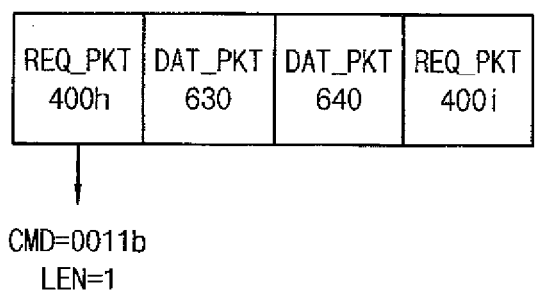
FIG. 10 illustrates a data packet being used as data mask information in the computing system of FIG. 1, according to an exemplary embodiment of the present invention.

FIG. 10 illustrates a data packet being used as data mask information in the computing system of FIG. 1, according to an exemplary embodiment of the present invention.

Referring to FIG. 10, a request packet 400*h*, data packets 630 and 640, and a request packet 400*i* are transmitted to the memory sub-system 200 from the host 100. When the command field CMD of the request packet 400*h* is set to 0011b, and the field LEN is set to 1, the data packet following the request packet 400*h* is used as data mask information. One piece of data mask information may include eight consecutive data packets, although the data mask information is not limited thereto. Since one data packet includes 4 bytes of data, one piece of data mask information may be used for writing 32 bytes of data with a data mask.

Figure 11:
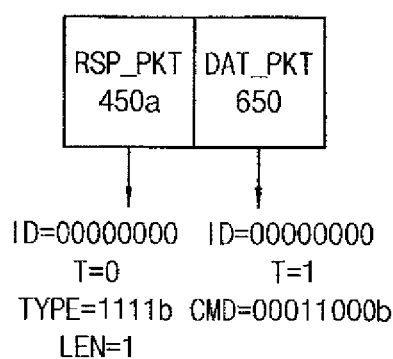
FIG. 11 illustrates a data packet being used as a message packet in the computing system of FIG. 1, according to an exemplary embodiment of the present invention.

FIG. 11 illustrates a data packet being used as a message packet in the computing system of FIG. 1, according to an exemplary embodiment of the present invention.

Referring to FIG. 11, a response packet 450*a* and a data packet 650 are consecutively transmitted to the host 100 from the memory sub-system 200. The identity fields of the response packet 450*a* and the data packet have the same value of 00000000. The response packet 450*a* has a field T of value 0, a type field TYPE of 1111b, and a field LEN of 1. The data packet 650, which is utilized as a message packet, has a field T of value 1, and a command field CMD of 00011000b. Since the response packet 450*a* has the identity field ID of 00000000 and the type field TYPE of 1111b, the data packet 650 following the response packet 450*a* is a message packet, and the data packet 650 uses an extended command. The extended command of the data packet 650 serving as the message packet is set to 00011000b, and the host 100 may set the interrupt monitor 130 and may enable the interruption of service.

Hereinafter, the computing system 10 of FIG. 1 is described with reference to FIGS. 1 through 11, according to an exemplary embodiment of the present invention.

When the host 100 is ready to write data in the main memory 260 or the storage device 270, the host 100 sets the command field 412 of the request packet 400*a* in FIG. 4 to 0001b, and inputs the destination address in the payload 420.

The host 100 transmits the request packet 400*a* including the destination address to the memory sub-system 200 through the interface unit 120 in the host 100, and successively transmits at least one data packet including data to be written to the memory sub-system 200. The interface unit 210 in the memory sub-system 200 parses the request packet 400*a* to provide the command and the address to the control unit 300. The control unit 300 performs a write operation to the area of the main memory 260 or the storage device 270 corresponding to the destination address based on the address and the command.

When the write operation is performed and data having the same pattern is to be written in the main memory 260 or the storage device 270, a pattern write command PTN_WR, which is one of the extended commands, may be used. When the host 100 uses the pattern write command PTN_WR, the host 100 sets the command field 412 of the request packet 400a to 1111b, and inputs the destination address in the payload 420. The host 100 transmits the request packet 400a including the destination address and the pattern write command PTN_WR to the memory sub-system 200 through the interface unit 120 of the host 100. The host 100 sets the extended command field 512 in the first data packet (e.g., the extended request packet) following the request packet 400a to 00011011b, and writes a repetition number of the data input in the data field 522. The control unit 300 receives the request packet 400a and the extended request packet, and the control unit 300 may repeatedly write data having the same pattern in an area corresponding to the destination address in the payload 420 of the request packet 400a. When the computing system 10 uses the extended request packets, the host 100 transmits the request packet and the extended request packet, and the memory sub-system 200 performs repeated write operations of the same pattern internally. Therefore, the amount of data being transmitted via the channel 15 and the bus 140 may be reduced, and as a result, power consumption of the computing system 10 may be reduced and performance of the computing system 10 may be improved.

When the host 100 is ready to read data stored in the main memory 260 or the storage device 270, the host 100 sets the command field 412 of the request packet 400a in FIG. 4 to 0010b, and inputs the destination address in the payload 420. The host 100 transmits the request packet 400a including the destination address to the memory sub-system 200 through the interface unit 120 in the host 100. The interface unit 210 in the memory sub-system 200 parses the request packet 400a to provide the command and the address to the control unit 300. The control unit 300 performs a read operation on the area of the main memory 260 or the storage device 270 corresponding to the destination address based on the address and the command. The memory sub-system 200 may transmit the response packet and at least one data packet including the read data to the host 100 through the interface unit 210 in the memory sub-system 200 during the read operation.

When the read operation is performed and data having the same pattern is to be read from the main memory 260 or the storage device 270, a pattern read command PTN_RD, which is one of the extended commands, may be used. When the host 100 uses the pattern read command PTN_RD, the host 100 sets the command field 412 of the request packet 400a 1111b, and inputs the destination address in the payload 420. The host 100 transmits the request packet 400a including the destination address and the pattern read command PTN_RD to the memory sub-system 200 through the interface unit 120 of the host 100. The host 100 sets the extended command field 512 in the first data packet (e.g., the extended request packet) following the request packet 400a to 00011010b. The control unit 300 receives the request packet 400a and the extended request packet, and the control unit 300 may read data having the same pattern from an area corresponding to the destination address in the payload 420 of the request packet 400a. When the computing system 10 uses the extended request packets, the host 100 transmits the request packet and the extended request packet, and the memory sub-system 200 performs one read operation on the same pattern and writes a repetition number in the response packet. The number of times the host 100 copies the read data corresponds to the repetition number. Therefore, the amount of data being transmitted via the channel 15 may be reduced, and as a result, power consumption of the computing system 10 may be reduced and performance of the computing system 10 may be improved during read operations.

Figure 12:
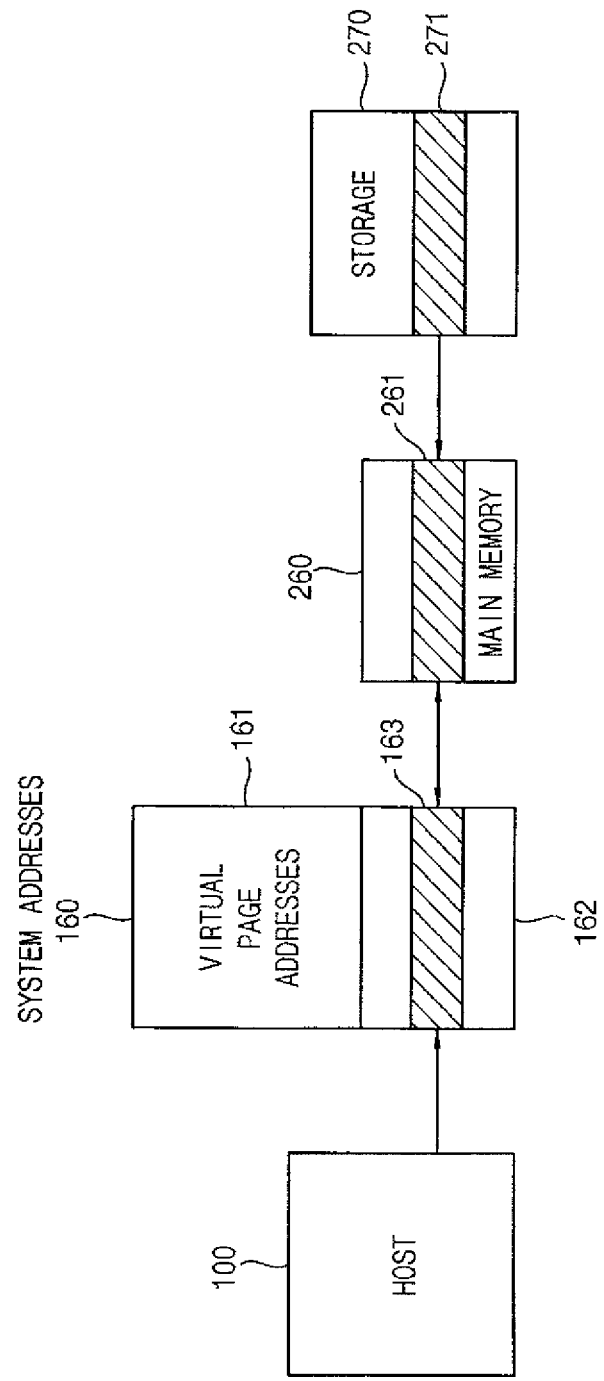
FIG. 12 illustrates an example of the storage device being accessed using resources of the main memory in the computing system of FIG. 1, according to an exemplary embodiment of the present invention.

FIG. 12 illustrates an example of the storage device being accessed using resources of the main memory in the computing system of FIG. 1, according to an exemplary embodiment of the present invention.

Referring to FIG. 12, an address of at least one page 271 of the storage device 270 is mapped to an area 261 of the main memory 260, and the host 100 accesses the at least one page 271 of the storage device 270 through the area 261 of the main memory 260 by referring to a physical address 163 included in physical page addresses 162 and virtual page addresses 161, which are included in system addresses 160 allocated to the host 100. That is, the host 100 may access the at least one page 271 of the storage device 270 through the main memory 260 by directly managing the physical addresses of the main memory 260.

Figure 13:
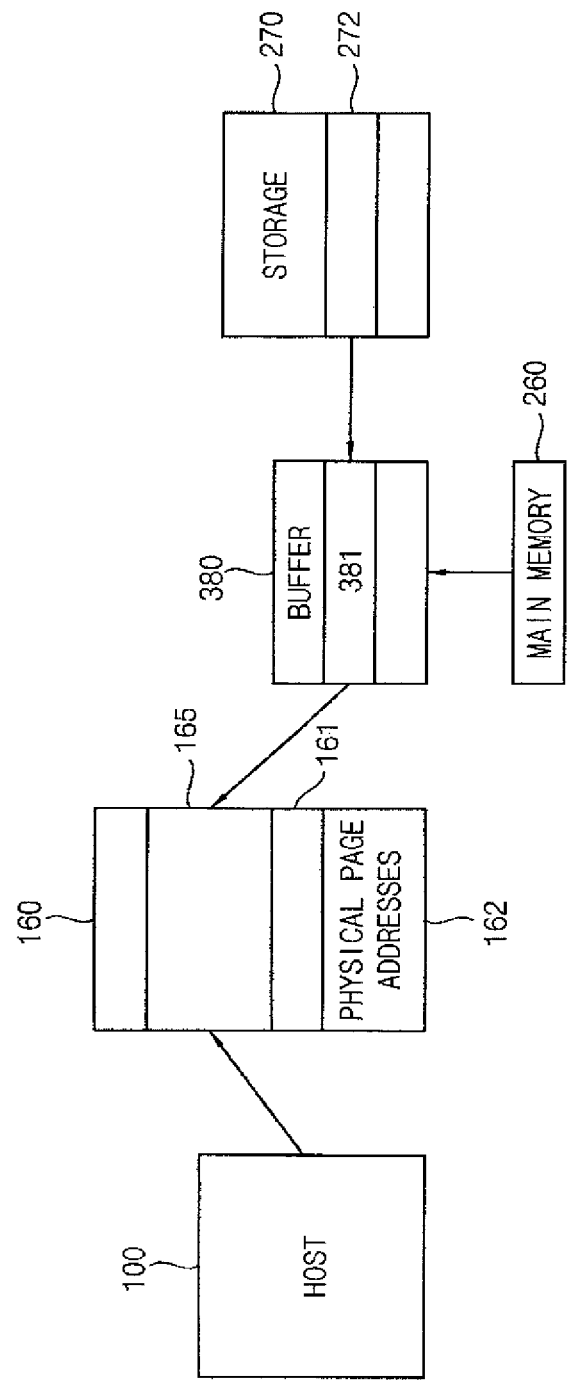
FIG. 13 illustrates an example of the storage device being accessed using resources of the main memory in the computing system of FIG. 1, according to an exemplary embodiment of the present invention.

FIG. 13 illustrates an example of the storage device being accessed using resources of the main memory in the computing system of FIG. 1, according to an exemplary embodiment of the present invention.

Referring to FIG. 13, an address of at least one page 272 of the storage device 270 is mapped to an address of an area 381 of the buffer 380, and the host 100 accesses the at least one page 272 of the storage device 270 through the area 381 of the buffer 380 by referring to an area 165 in the virtual page addresses 161 and the physical page addresses 162, which are included in system addresses 160 allocated to the host 100. The virtual page addresses 161 are address areas of virtual pages of the main memory 260, and the virtual page addresses 161 are accessible by the host 100. Therefore, the host 100 may access the at least one page 272 of the storage device 270 by accessing the virtual page addresses 161 of the main memory 260 without using the physical page addresses 162 of the main memory 260.

When the host 100 accesses the storage device 270 using resources of the main memory 260, the host 100 may use extended commands such as, for example, MapIMS and UnMapIPS for synchronizing an address map of the storage device 270 with an address map of the main memory 260, or desynchronizing the address map of the storage device 270 from the address map of the main memory 260. In this case, the addresses, including virtual page addresses and physical page addresses of the main memory 260, requested by the host 100 and the addresses of the storage device 270 need to be aligned with 4 KB. When the data is to be written in the storage device 270 in FIGS. 10 and 11, the data is written in the storage device 270 according to an order in which the extended command MapIMS is transmitted from the host 100. Data mapped to an area of the main memory 260 may be moved to the storage device 270 using a command FlushIMS.

Figure 14:
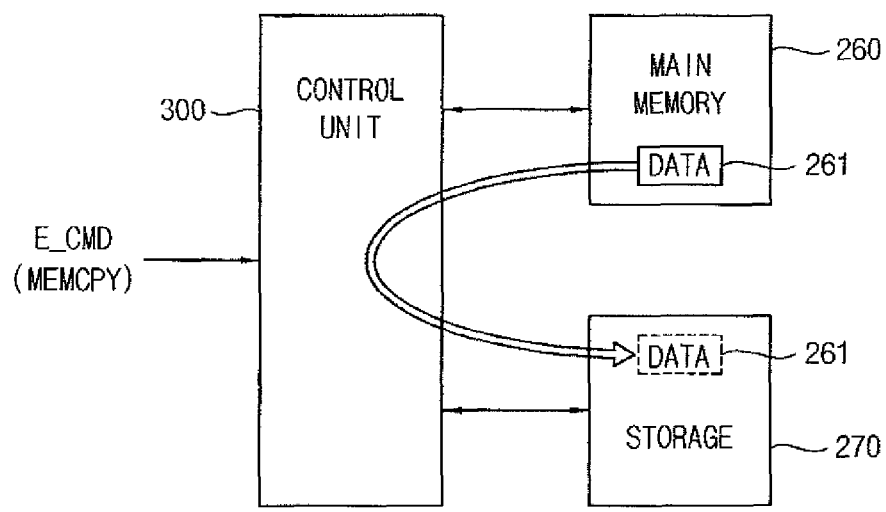
FIG. 14 illustrates an example of a memory copy command being executed in the computing system of FIG. 1, according to an exemplary embodiment of the present invention.

FIG. 14 illustrates an example of a memory copy command being executed in the computing system of FIG. 1, according to an exemplary embodiment of the present invention.

When executing the memory copy command MEMCPY, the host 100 sets the command field 412 of the request packet 400a to 0001b, and inputs the destination address in the payload 420 to transmit the request packet 400a including the memory copy command MEMCPY to the memory sub-system 200 through the interface unit 120 of the host 100. In addition, the host 100 sets the extended command field 512 in the first data packet (e.g., the extended request packet) following the request packet 400*a* to 00011001b, and inputs addresses of the area storing data to be copied in the source address field 521 to transmit the extended request packet to the memory sub-system 200. The control unit 300 receives the request packet 400*a* and the extended request packet, and the control unit 300 may copy the data stored in the area designated by the addresses in the source address field 521 to the area designated by the destination address in the payload 420 in the request packet 400*a*. In FIG. 14, the data 261 stored in the area of the main memory 260 is copied to the area of the storage device 270. That is, the source addresses are addresses of the area of the main memory 260 and the destination addresses are addresses of the area of the storage device 270 in FIG. 14.

Figure 15:
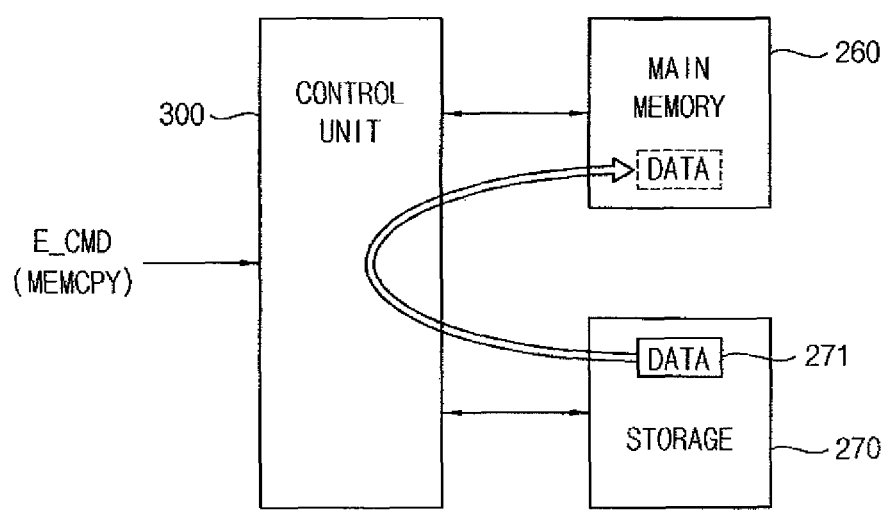
FIG. 15 illustrates an example of a memory copy command being executed in the computing system of FIG. 1, according to an exemplary embodiment of the present invention.

FIG. 15 illustrates an example of a memory copy command being executed in the computing system of FIG. 1, according to an exemplary embodiment of the present invention.

FIG. 15 illustrates that the data 271 stored in an area of the storage device 270 is copied to an area of the main memory 260. That is, the source addresses are addresses of the area of the storage device 270 and the destination addresses are addresses of the area of the main memory 260 in FIG. 15.

Figure 16:
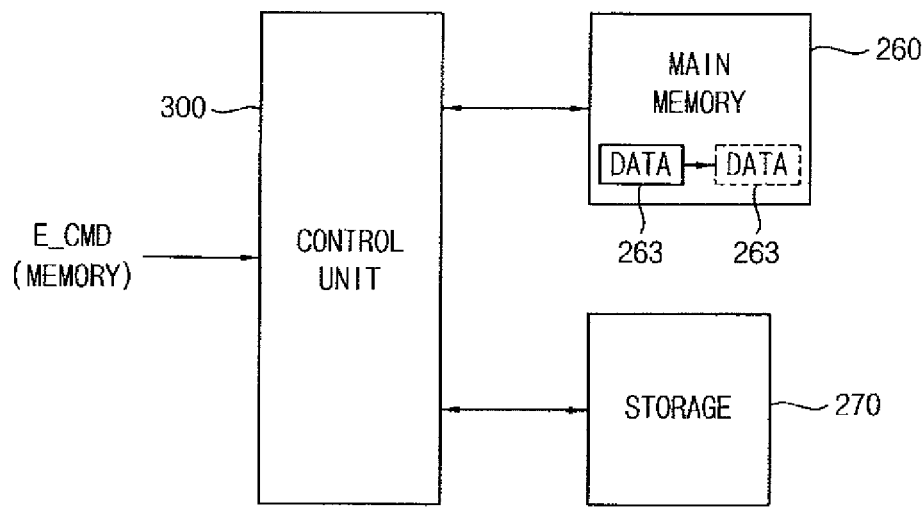
FIG. 16 illustrates an example of a memory copy command being executed in the computing system of FIG. 1, according to an exemplary embodiment of the present invention.

FIG. 16 illustrates an example of a memory copy command being executed in the computing system of FIG. 1, according to an exemplary embodiment of the present invention.

FIG. 16 illustrates that the data 263 stored in a first area of the main memory 260 is copied to a second area different from the first area of the main memory 260. That is, the source addresses are addresses of the first area of the main memory 260 and the destination addresses are addresses of the second area of the main memory 260 in FIG. 16.

As described above with reference to FIGS. 15 to 17, when the extended command is the memory copy command MEM-CPY, data is transferred between the main memory 260 and the storage device 270 or is transferred within the main memory 260. Therefore, the amount of data being transmitted via the channel 15 and the bus 140 may be reduced, and as a result, power consumption of the computing system 10 may be reduced and performance of the computing system 10 may be improved.

Figure 17:
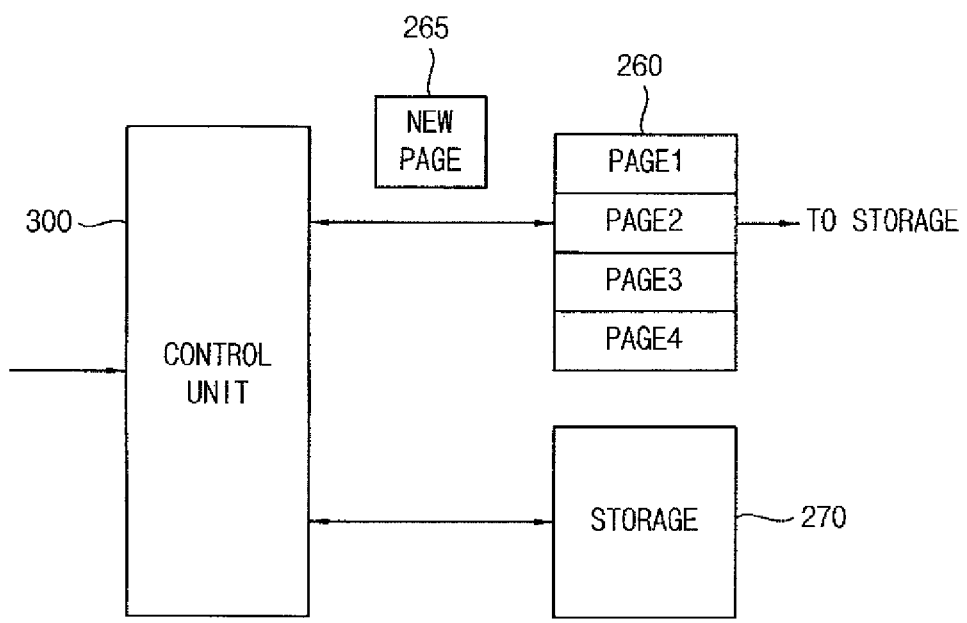
FIGS. 17 and 18 illustrate a swap operation being performed in the computing system of FIG. 1, according to an exemplary embodiment of the present invention.
Figure 18:
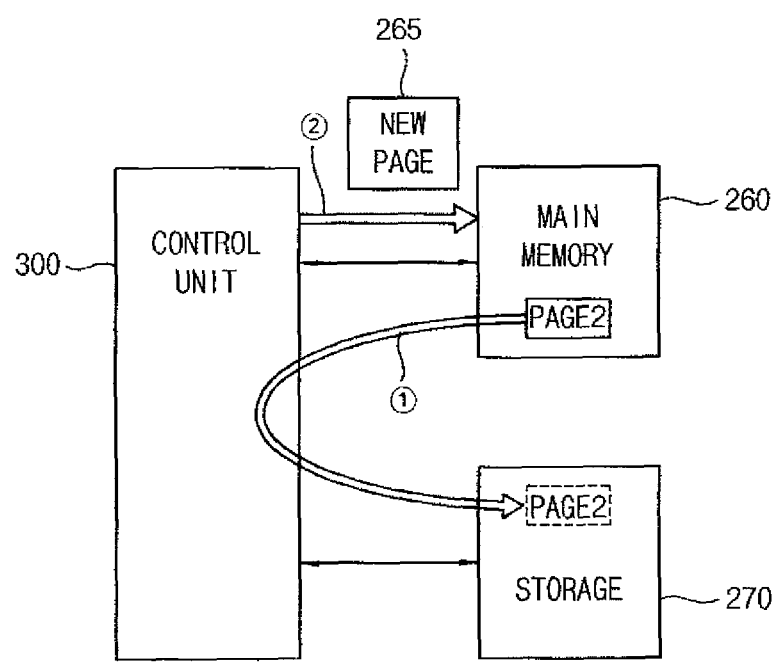

FIGS. 17 and 18 illustrate a swap operation being performed in the computing system of FIG. 1, according to an exemplary embodiment of the present invention.

Referring to FIGS. 17 and 18, a main memory 260 may be divided into a plurality of segments or a plurality of pages PAGE1~PAGE4 into which data may be stored. These segments/pages may include, for example, memory cells, and may be referred to herein as physical pages.

When a new page 265 of data is to be allocated in the main memory 260, but no unused physical page in the main memory 260 exists, a swap operation in which the control unit 300 stores one page (e.g., PAGE2 in FIG. 17) of the pages PAGE1~PAGE4 loaded in the main memory 260 to the storage device 270 may be performed. The control unit 300 is informed that no unused physical page in the main memory 260 exists based on the first status information signal STSINF1 received from the scheduling logic unit 310, and the control unit 300 temporarily stores the new page 265 of data in the buffer 380. The control unit 300 transmits one (e.g., PAGE2 in FIG. 17) of the pages PAGE1-PAGE4 loaded in the main memory 260 to the storage device 270 to be stored through the first internal interface 340, the common interface unit 210, and the second internal interface 360. The control unit 300 may load the new page 265 of data to the main memory 260 from the buffer 380. When the swap operation is performed, storing some pages of data may be performed in the memory sub-system 200 in case no unused physical page in the main memory 260 exists. Therefore, the amount of data being transmitted via the channel 15 and the bus 140 may be reduced, and as a result, power consumption of the computing system 10 may be reduced and performance of the computing system 10 may be improved.

Figure 19:
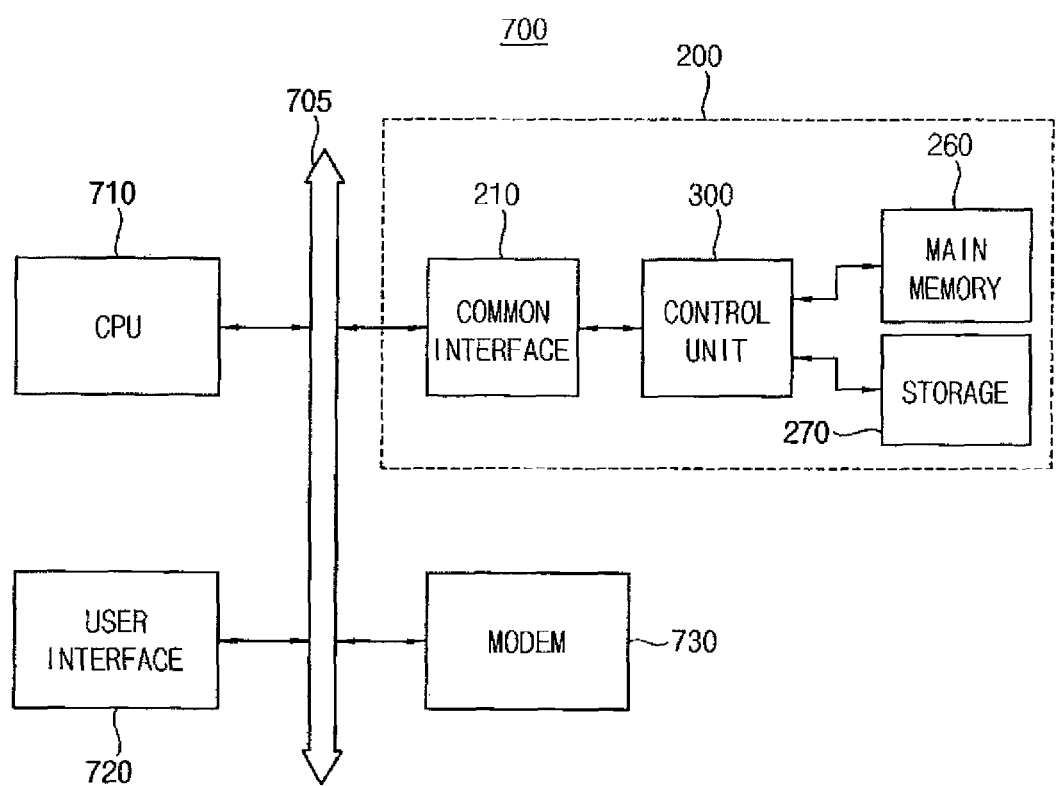
FIG. 19 is a block diagram illustrating a mobile system including the memory sub-system of FIG. 1, according to an exemplary embodiment of the present invention.

FIG. 19 is a block diagram illustrating a mobile system including the memory sub-system of FIG. 1, according to an exemplary embodiment of the present invention.

Referring to FIG. 19, a mobile system 700 includes a processor 710, a user interface 720, a modem 730 such as, for example, a baseband chipset, and the memory sub-system 200.

The processor 710 performs various computing functions such as, for example, executing specific software for performing specific calculations or tasks. For example, the processor 710 may be a microprocessor, a central processing unit (CPU), a digital signal processor, etc. The processor 710 may be coupled to the main memory 260 via a bus 705, such as, for example, an address bus, a control bus and/or a data bus. Further, the processor 710 may be coupled to an extension bus, such as, for example, a peripheral component interconnect (PCI) bus, and may control the user interface 720, which may include, for example, at least one input device such as a keyboard, a mouse, a touch screen, etc., and/or at least one output device such as a printer, a display device, etc. The modem 730 may perform wired or wireless communication with an external device. In an exemplary embodiment, the mobile system 700 may further include, for example, a power supply, an application chipset, a camera image processor (CIS), etc. The memory sub-system 200 includes one common interface unit 210, a control unit 300, a main memory 260 and a storage device 270. The main memory 260 may be implemented using, for example, dynamic random access memory (DRAM), however the main memory 260 is not limited thereto. For example, the main memory 260 may also be implemented using a static random access memory (SRAM), a phase-change random access memory (PRAM), a ferroelectric random access memory (FRAM), a resistive random access memory (RRAM), a magnetic random access memory (MRAM), etc. The storage device 270 may be implemented using, for example, a NAND flash memory or a NOR flash memory, however the storage device 270 is not limited thereto. The control unit 300 controls the main memory 260 and the storage device 270 in response to a request from the processor 710. The interface unit 210 is operatively coupled to the control unit 300, and the interface unit 210 accesses the main memory 260 and the storage device 270 in response to a request from the processor 710.

The processor 710 and the memory sub-system 200 execute transactions based on a packet PKT. For example, the processor 710 transmits a request packet causing the memory sub-system 200 to perform a specific operation(s), and the memory sub-system 200 parses the command in the received request packet, performs an operation(s) corresponding to the command, and provides an operation result to the processor 710. In addition, the memory sub-system 200 accesses the main memory 260 and the storage device 270 through the one common interface unit 210. Therefore, when data is exchanged between the main memory 260 and the storage device 270, the bus 705 between the processor 710 and the memory sub-system 200 and a bus in the processor 710 are not occupied, and as a result, power consumption of the mobile system 700 may be reduced, and performance of the mobile system 700 may be improved.

In an exemplary embodiment, the mobile system 700 and/or components of the mobile system 700 may be packaged in various forms, such as, for example, package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to various exemplary embodiments of the present invention, power consumption of a computing system may be reduced and performance of a computing system may be improved by accessing the main memory and the storage device of the computing system through one common interface unit, which may reduce occupation of the channel between a host and a memory sub-system of the computing system, and the internal bus of the host.

Exemplary embodiments of the present invention may be applied to various computing system including, for example, different types of memory devices.

While the present invention has been particularly shown and described with reference to the exemplary embodiments thereof, it will be understood by those skilled in the art that various changes in faun and detail may be made therein without departing from the spirit and scope of the present invention as defined by the following claims.

What is claimed is:
1. A memory sub-system, comprising:
a main memory;
a storage device;
a control unit configured to control the main memory and the storage device; and
a common interface unit operatively coupled to the control unit, wherein the common interface unit is configured to access the main memory and the storage device through the control unit in response to a request from a host,
wherein the control unit is configured to control the main memory and the storage device based on a command included in a request packet received from the host,
wherein a first data packet following the request packet is an extended request packet, and the control unit is configured to control the main memory and the storage device based on an extended command included in an extended header of the extended request packet when the command corresponds to an extended memory operation.

2. The memory sub-system of claim 1, wherein the request packet and the extended request packet each comprise a payload, the payload of the extended request packet comprises a source address indicating a source area in which data is stored, and the payload of the request packet comprises a destination address indicating a target area in which the data is to be stored, when the extended command corresponds to a memory copy operation that copies data stored in the main memory or in the storage device.

3. The memory sub-system of claim 2, wherein the source address designates a first area in the main memory and the destination address designates a second area in the storage device.

4. The memory sub-system of claim 2, wherein the source address designates a first area in the storage device and the destination address designates a second area in the main memory.

5. The memory sub-system of claim 2, wherein the source address designates a first area in the main memory and the destination address designates a second area in the main memory, wherein the second area is different from the first area.

6. The memory sub-system of claim 1, wherein the control unit is configured to control the storage device by mapping at least one page of the storage device to an area of the main memory.

7. The memory sub-system of claim 6, wherein the control unit is configured to synchronize a first map of the storage device with a second map of the main memory using a synchronization command included in the extended command, or desynchronize the first map of the storage device with the second map of the main memory using a desynchronization command included in the extended command.

8. The memory sub-system of claim 6, wherein the control unit is configured to map at least one page address of the storage device to a physical address of the main memory, and the host is configured to directly manage the physical address of the main memory, wherein the physical address of the main memory is allocated to the host.

9. The memory sub-system of claim 6, wherein the control unit further comprises a buffer, the control unit is configured to map at least one page address of the storage device to a buffer address of the buffer, and the host is configured to manage a virtual address of the main memory mapped to the buffer address.

10. The memory sub-system of claim 1, wherein the control unit is configured to perform a swap operation that stores at least one page loaded in the main memory in the storage device when a new page is to be allocated in the main memory and the main memory does not include an unused physical page.

11. The memory sub-system of claim 1, wherein the control unit further comprises a special function register configured to store information indicating an initial setting of the storage device.

12. A computing system, comprising:
a host comprising a processor; and
a memory sub-system operatively coupled to the host, wherein the memory sub-system is configured to execute a request received from the host, wherein the memory sub-system comprises:
a main memory;
a storage device;
a control unit configured to control the main memory and the storage device; and
a common interface unit operatively coupled to the control unit, wherein the common interface unit is configured to access the main memory and the storage device through the control unit in response to the request received from the host,
wherein the control unit is configured to control the main memory and the storage device based on a command included in a request packet received from the host,
wherein a first data packet following the request packet is an extended request packet, and the control unit is configured to control the main memory and the storage device based on an extended command included in an extended header of the extended request packet when the command corresponds to an extended memory operation.

13. An interface unit for a computing system, comprising:
a decoder, comprising:
a header parser configured to extract a header from a packet received from a host, analyze the extracted header, and provide a command to a control unit of a memory sub-system in the computing system, and a payload detector configured to detect a payload in the packet received from the host, and provide the detected payload to the control unit; and an encoder, comprising:

a header generator configured to generate a header of a packet to be transmitted to the host based on an output received from the control unit, and a payload generator configured to generate a payload of the packet to be transmitted to the host based on the output received from the control unit, wherein the interface unit is disposed in the memory sub-system, and is configured to access a main memory and a storage device in the memory sub-system through the control unit, wherein the control unit is configured to control the main memory and the storage device based on the command, wherein the decoder further comprises:

an extended header parser configured to extract an extended header from an extended request packet received from the host, analyze the extracted extended header, and provide an extended command to the control unit, wherein the control unit is configured to control the main memory and the storage device based on the extended command when the command corresponds to an extended memory operation.

14. The interface unit of claim 13, wherein the payload of the packet received from the host and the payload of the packet to be transmitted to the host each comprise an address and data.

* * * * *